United States Patent [19]

Hikita

[11] Patent Number: 4,509,608

[45] Date of Patent: Apr. 9, 1985

[54] METHOD OF SELECTING ELECTRONIC SCALE OPERATING MODE, AND ELECTRONIC SCALE USING SAID METHOD

[75] Inventor: Michiyasu Hikita, Kusatsu, Japan

[73] Assignee: Kabushiki Kaisha Ishida Koki Seisakusho, Kyoto, Japan

[21] Appl. No.: 468,706

[22] Filed: Feb. 22, 1983

[30] Foreign Application Priority Data

Feb. 22, 1982 [JP] Japan .................................. 57-26957

[51] Int. Cl.³ ...................... G01G 9/00; G01G 19/413
[52] U.S. Cl. .......................................... 177/1; 177/25; 177/50; 177/165; 364/466
[58] Field of Search .................... 364/466, 467; 177/1, 177/25, 50, 165

[56] References Cited

U.S. PATENT DOCUMENTS

3,899,951  8/1975  Griffith et al. .................. 84/1.03 X
4,412,591  11/1983  Reichmuth et al. .............. 177/25 X
4,415,048  11/1983  Teraoka ............................. 177/25 X Primary Examiner—E. A. Goldberg
Assistant Examiner—Patrick W. Foster
Attorney, Agent, or Firm—Staas & Halsey

[57] ABSTRACT

A method of selecting the operating mode of an electronic scale, and an electronic scale using said method, wherein either a computing mode or a checking mode is selected and operation is executed based on the selected mode. The computing mode is a mode wherein an arithmetic operation is performed based on the weight of articles sensed by a weight sensor and on items of data input from an input device having a plurality of keys, and wherein a display device displays information relating to the articles, which information includes the result of the arithmetic operation. The checking mode is a mode wherein the operation of the electronic scale is checked for abnormality. The method includes steps of sensing the state of each key of the input device at the time that power is introduced to the electronic scale, selecting the computing mode to enable execution of operation in said mode when it is sensed in the first step that no key of the input device is in the ON state, and selecting the checking mode to enable execution of operation in said mode when it is sensed in the first step that any key of the input device is in the ON state.

10 Claims, 10 Drawing Figures

METHOD OF SELECTING ELECTRONIC SCALE OPERATING MODE, AND ELECTRONIC SCALE USING SAID METHOD

BACKGROUND OF THE INVENTION

This invention relates to a method of selecting the operating mode of an electronic scale of the type for measuring weights of articles and for computing and displaying the cost of the articles and the number thereof, based on the measured weight, which method allows the operation of the scale to be checked with facility. The invention further relates to an electronic scale which uses the aforementioned method.

Scales which basically are for weighing articles have undergone remarkable technological advancements in recent years and now are capable not only of weighing but also of computing the cost of a batch of articles as well as the number of individual articles among articles of the same shape, provided that the scale is supplied with inputs of unit price and unit weight. Scales having the foregoing capabilities are referred to as electronic scales and have an input device such as a keyboard as well as arithmetic circuitry. The external appearance of such an electronic scale is as shown in FIG. 1, in which (A) is a perspective view of the overall scale, (B) is an enlarged view of a display provided on the electronic scale, and (C) is an enlarged view of an operation panel also provided on the electronic scale.

Figure 1A:
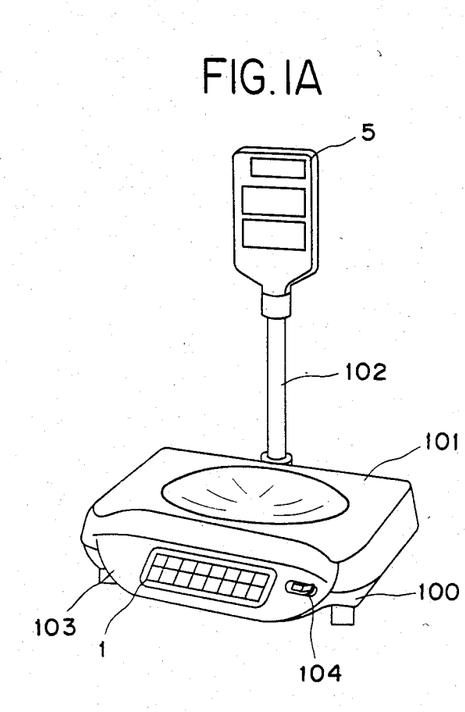
FIGS. 1(A) to (C) show the external appearance of an electronic scale according to the present invention, FIG. 1(A) being a perspective view of the overall electronic scale, FIG. 1(B) being an enlarged view of a display device provided on the electronic scale and FIG. 1(C) being an enlarged view of a operation panel provided on the electronic scale.
Figure 1B:
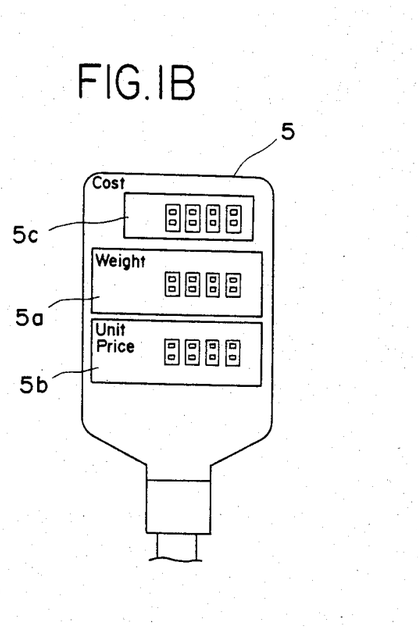
Figure 1C:
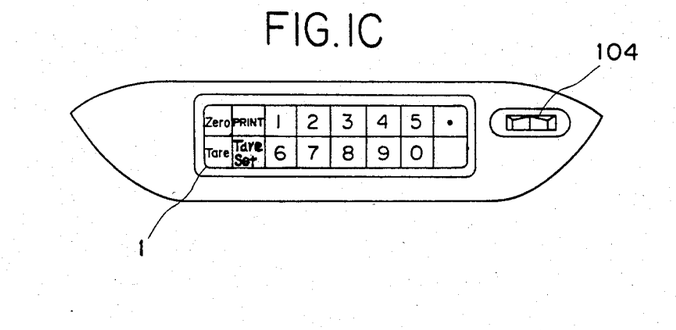

As shown in FIG. 1(A), the electronic scale includes a main body 100 incorporating various control circuits, a weighing tray 101 provided on the main body 100 for receiving the articles to be weighed, and a display device 5 supported on a column 102 affixed to the main body 100. The front side of the main body 100 is provided with an operation panel 103 having an input device 1 and a power switch 104. The display device 5, shown in greater detail in FIG. 1(B), is composed of a weight display section 5a for displaying the measured weight of articles placed on the weighing tray 101, a unit price display section 5b for displaying a unit price entered by operating the input device 1, and a cost display section 5c for displaying a cost computed from the measured weight and set unit price. As shown in FIG. 1(C), the input device 1 of the operation panel 103 includes a ten-key arrangement of numeric keys from "0" to "9", as well as function keys marked "ZERO", "PRINT", "TARE", "UNIT PRICE", "." and "CL".

Figure 2:
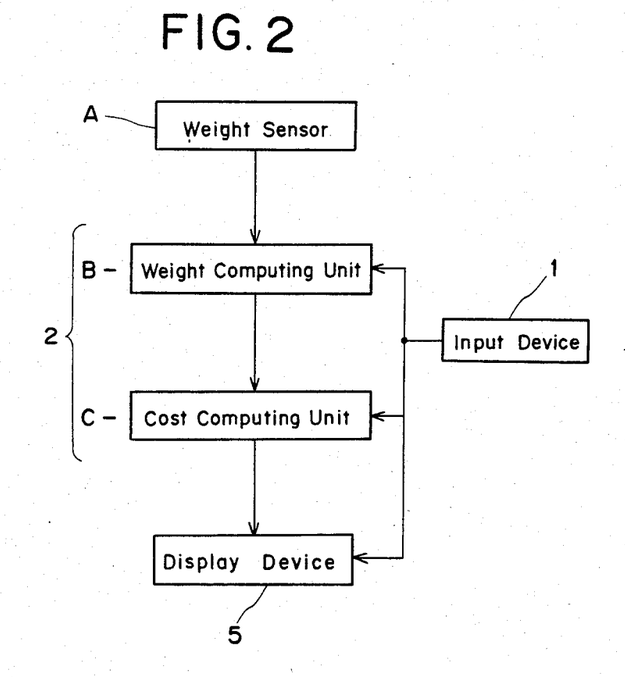
FIG. 2 is a block diagram for describing the basic function of an electronic scale.

Reference will now be had to FIG. 2 to describe the basic function of the above-described electronic scale. The electronic scale comprises a weight sensor A for sensing the weight of articles placed in the weighing tray 101, an arithmetic device 2 including a weight computing unit B for computing true weight by subtracting the tare weight from the output of the weight sensor A, and a cost computing unit for computing cost by multiplying the true weight by a unit price, the display device 5 for displaying, e.g., unit price, tare weight and cost, and the input device 1 having the ten-key arrangement and function keys for providing the arithmetic device 2 and display device 5 with inputs of unit price and tare weight. The arithmetic device 2 is provided with a RAM (random access memory) for storing various data, and with a printer (not shown) having printing circuitry and a printing drum. The weight sensor A is equipped with an A-D converter (analog-to-digital) converter for converting a measured analog weight into a digital value.

An electronic scale of the above type, having a large number of components arranged in the manner described, is checked at the factory prior to delivery to make sure that all the components are operating normally. Similarly, if a complaint stemming from a malfunction or failure is received from a user, the components must also be checked to locate the source of the problem. In either case, items checked are as follows:

(1) Zero adjustment

This involves displaying the currently prevailing output produced by the A-D converter of weight sensor A while the weighing tray 101 is empty. The displayed value is then adjusted to give a weight reading of zero.

(2) Key reliability

All keys are checked to determine whether they function properly when pressed. Numeric keys, for example, are pressed to determine whether the corresponding numerical values appear on the display device 5. Each function key, on the other hand, is assigned a specific number in advance. When a function key is pressed, therefore, the proper number should appear on the display device 5.

(3) Display segments

The display device is checked to assure that the display segments for the numerals 0 through 9 light properly.

(4) RAM

The RAM in the microcomputer of the arithmetic device 2 is checked for malfunction.

(5) Printing drum

The characters (printing type) on the printing drum are checked for flaws.

(6) Print driver

The printing circuitry is checked for defects.

(7) Display driver

The display circuitry is checked for defects.

(8) Display brightness

This involves checking the brightness of the display device.

According to the prior art, checking an electronic scale for the aforesaid items entails providing the scale with a special start switch, externally connecting a read-only memory (ROM) to the arithmetic device of the electronic scale, which ROM contains a stored test program for checking purposes, and turning on the start switch so that the arithmetic device may execute the test program stored in the ROM. For example, once an operating mode based on the test program has been initiated, the check for item (1) may be executed by pressing the numeric key marked "1", the check for item (2) by pressing the numeric key marked "2", and so on.

With the foregoing conventional method, the electronic scale must be specially provided with the start switch. Another disadvantage is that the ROM must be connected to the scale, making it difficult for an ordinary user to perform the check himself. The procedure can be troublesome even for a skilled dealer.

SUMMARY OF THE INVENTION

Accordingly, an object of the present invention is to provide a method of selecting the operating mode of an electronic scale, and an electronic scale using said method, through which the operation of the electronic scale can be checked in a simple manner.

Another object of the present invention is to provide a method of selecting the operating mode of an electronic scale, and an electronic scale using said method, wherein an operational check mode can be designated by utilizing an input device provided on the electronic scale.

Still another object of the present invention is to provide a method of selecting the operating mode of an electronic scale, and an electronic scale using said method, wherein an operational check mode can be designated by an input device without providing the input device with additional keys.

Yet another object of the present invention is to provide a method of selecting the operating mode of an electronic scale, and an electronic scale using said method, wherein an operational check mode as well as a computing mode of the electronic scale can be designated selectively by an input device provided on the electronic scale.

A further object of the present invention is to provide a method of selecting the operating mode of an electronic scale, and an electronic scale using said method, wherein an ordinary individual is capable of checking the operation of the scale in a simple manner.

According to the present invention, these and other objects are attained by providing a method of selecting the operating mode of an electronic scale, and an electronic scale using said method, wherein either a computing mode or a checking mode is selected and operation is executed based on the selected mode. The computing mode is a mode wherein an arithmetic operation is performed based on the weight of articles sensed by a weight sensor and on items of data input from an input device having a plurality of keys, and wherein a display device displays information relating to the articles, which information includes the result of the arithmetic operation. The checking mode is a mode wherein the operation of the electronic scale is checked for abnormality. The method includes steps of sensing the state of each key of the input device at the time that power is introduced to the electronic scale, selecting the computing mode to enable execution of operation in said mode when it is sensed in the first step that no key of the input device is in the ON state, and selecting the checking mode to enable execution of operation in said mode when it is sensed in the first step that any key of the input device is in the ON state. It is thus possible to select either a computing mode or checking mode depending upon whether or not a key is pressed at the introduction of power to the electronic scale. This facilitates the checking operation and enables an ordinary user to check the operation of the electronic scale in a simple manner.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 3:
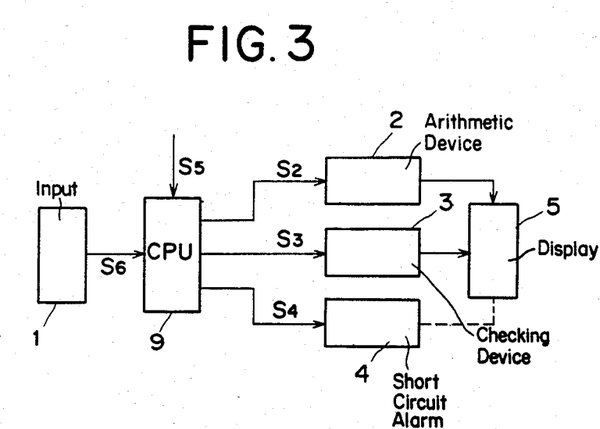
FIG. 3 is a simplified block diagram useful in describing the fundamental principle of the present invention.

Reference will now be had to FIG. 3 showing the fundamental principle of the inventive electronic scale when rendered in the form of a block diagram. The electronic scale incorporates the input device 1, the arithmetic device 2, a checking device 3, and the display device 5 for displaying information entered by the input device 1, the result of calculation performed by the arithmetic device 2, and the result of a checking operation performed by the checking device 3.

The checking device 3 performs the check for item (1) above when a "1" numeric key is pressed, the check for item (2) when a "2" numeric key is pressed, and so on for the items (3) through (8) when the numeric keys "3" through "8" are pressed, respectively. Designated at 4 is a short-circuit alarm device. Each numeric key and each of several function keys has a particular number assigned thereto. If any of these keys should develop a short circuit, the alarm device 4 will cause the corresponding number to be displayed on the display device 5.

Figure 4:
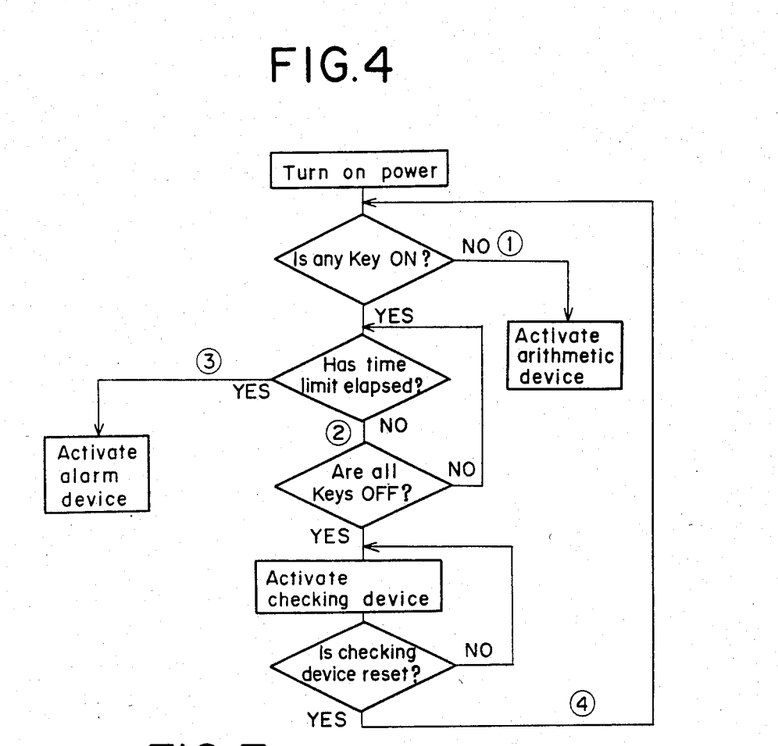
FIG. 4 is a processing flowchart useful in describing the fundamental principle of the present invention.

According to a feature of the present invention, the electronic scale is arranged to activate either the arithmetic device 2 to establish a computing mode or the checking device 3 to establish a checking mode, depending upon the particular situation. To this end, when power has been introduced, the electronic scale discriminates whether any key on the input device 1 is in the ON state (indicating closure of the associated switch contacts), and then selects the operating mode based on the result of the discrimination. The relevant processing, expressed in simplified form in the flowchart of FIG. 4, proceeds as follows:

(1) If no key is in the ON (depressed) state following the introduction of power, the arithmetic device will be activated to establish a computing mode, which is the normal operating mode of the electronic scale.

(2) If any key is in the ON state at the time that power is introduced but then is placed in the OFF state (i.e., released) after the introduction of power, then the checking device will be activated to establish the checking mode. This is a mode established by the operator intentionally in order to check for a malfunction. Thus, by intentionally holding any key in the ON, or depressed, state as the power switch is closed, the operator may activate the checking device 3 to establish the checking mode of operation.

(3) If a key in the ON state at the time power is introduced does not assume the OFF state even with the passage of a fixed length of time measured from the introduction of power, then this indicates that the key has developed a short circuit. When this is the case, the alarm device 4 can be actuated to give an indication of the short-circuited key.

(4) When the checking device 3 is activated and then completes the checking operation outlined hereinabove, the checking device is reset and the arithmetic device 2 is activated at the same time. This simplifies the operator's task.

The foregoing method of selecting the operating mode can be realized through use of a processor (CPU) 9 arranged as shown in FIG. 3, the processor having been programmed in the appropriate manner. When required, the CPU 9 generates a command signal S2 for activating the arithmetic device 2, a command signal S3 for activating the checking device 3, and a command signal S4 for activating the alarm device 4. A signal S5, produced when power is introduced, is applied to the CPU 9. The input device 1 applies a key ON signal S6 to the CPU 9 when any key is in the ON state at the time that power is introduced. When the operator wishes to establish the checking mode and, hence, places any key in the ON (depressed) state intentionally as he introduces power and then releases the key thereafter, the signal S6 will, if conditions are normal, go high (to logic "1") only for as long as the key is held depressed following the introduction of power. However, if any key on the input device 1 has developed a short circuit, then signal S6 will go high at the instant power is applied and will remain high even after the passage of a fixed period of time.

Thus, in the arrangement of FIG. 3, the CPU 9 decides to produce the arithmetic device activation command S2 or the checking device activation command S3 depending upon whether the key ON signal (logic "1") is an input thereto at the introduction of power. If a short circuit is discriminated, then the CPU 9 issues the alarm device activation command S4 to set the alarm device 4 into operation.

Figure 5:
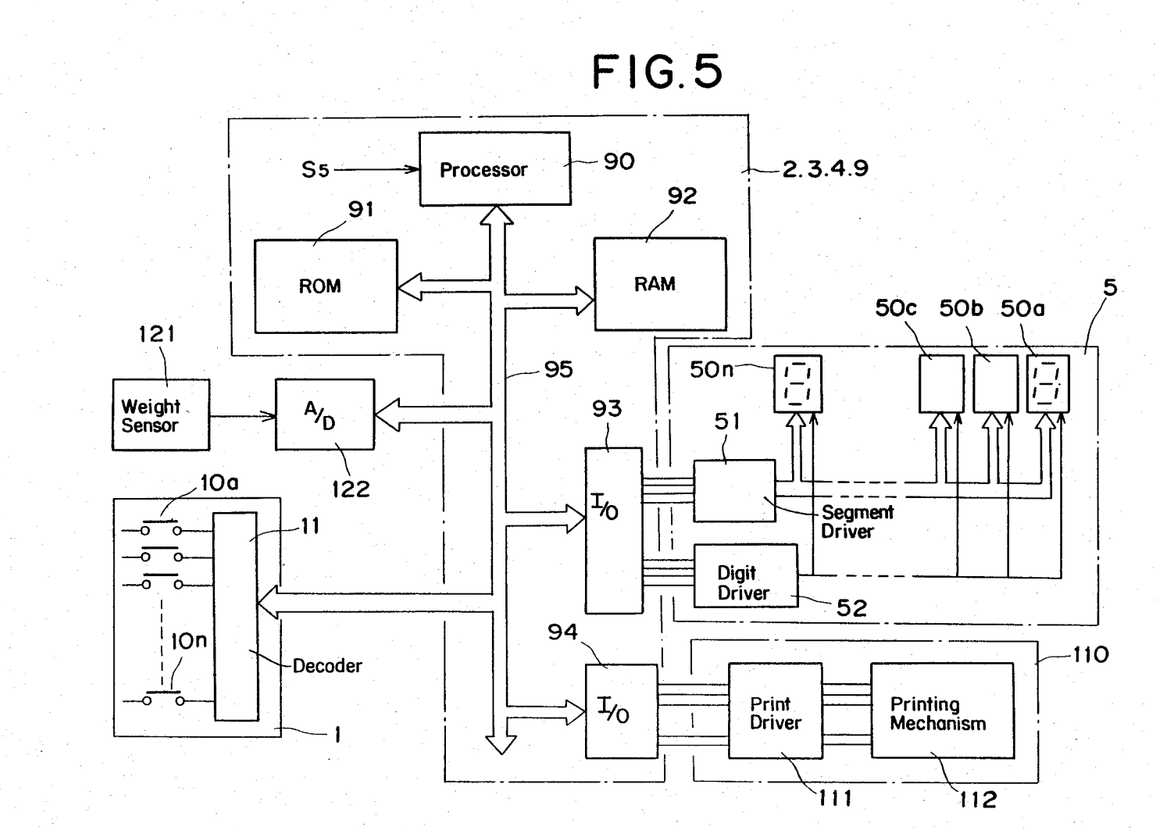
FIG. 5 is a block diagram of a first embodiment of the present invention.

A block diagram embodying the present invention is illustrated in FIG. 5. Note that portions similar to those shown in FIG. 3 are designated by like reference characters. The input device 1 includes key contacts 10a through 10n and a decoder circuit 11. The display device 5 includes display elements 50a through 50n, each display element being composed of a numeric display member constituted by seven segments. The display device 5 also includes a segment driver 51 for driving the segments of each of the display elements 50a through 50n, as well as a digit driver 52 for driving the digits composed of the display elements 50a through 50n. The abovementioned arithmetic device 2, checking device 3, alarm device 4 and CPU 9 are constituted by a control circuit constructed of blocks 90 through 94, interconnected by a bus line 95. Block 90 represents a processor such as a microprocessor. Block 91 is a read-only memory (ROM) for storing the control program of the processor 90. The control program contains a mode selection program, a computation program for when the electronic scale performs an actual weighing operation, and a test program for executing a checking operation. Block 92 is a random access memory (RAM) for storing the result of computations performed by the processor 90, for storing data received from the input device 1, and for storing weight values obtained from a weight sensor, as described in further detail below. The blocks 93, 94 are input/output ports, the former connected to the display device 5, the latter connected to a printer 110, described below. The bus line 95 mentioned earlier is an address/data bus. The aforementioned printer 110 has a print driver 111 and printing mechanism 112 and is adapted to print out, on receipts, labels and the like, such information as the weight, unit price and cost of the articles weighed. A weight sensor 121 senses the weight of articles placed in the abovementioned weighing tray and may comprise a load cell. The output of the weight sensor 121 is applied to an analog-to-digital (A-D) converter 122 for converting the weight sensor output, namely an analog value indicative of the sensed weight, into a digital value.

Figure 6:
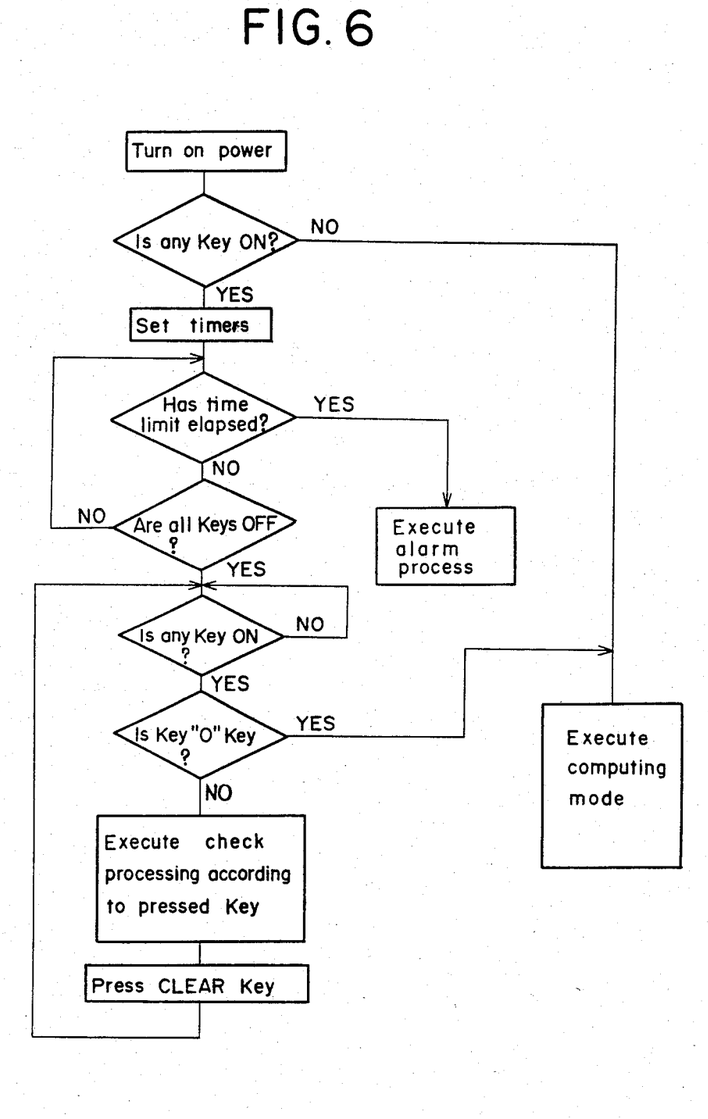
FIG. 6 is a flowchart of processing executed by the arrangement of FIG. 5.

The operation of the arrangement shown in FIG. 5 will now be described while referring to the flowchart of FIG. 6.

(a) First, the power switch 104 (FIG. 1) is placed in the ON (closed) position, sending the power ON signal S5(logic "1") to the processor 90. The processor 90, under the control of the mode selection program loaded in ROM 91, responds to this signal by sensing, through the bus 95, the state of each key contact 10a through 10n of the input device 1. If any of these key contacts is found to be closed, representing the ON state, then the decoder 11 of the input device 1 will issue a code corresponding to the strobe signals and the key (keys) in the ON state.

(b) If none of the key contacts 10a through 10n is closed, then the processor 90 reads the computing program out of the ROM 91 and executes the program. This means that the electronic scale is placed in the computing mode so that the processor may sense, based on the output of the A-D converter 122, whether articles have been placed in the weighing tray 101. If they have, then the processor 90 reads the output of the A-D converter 122, namely the sensed weight W of the articles, and stores the weight W in the ram 92, all via the bus 95. The processor also delivers the weight W to the input/output port 93 via the bus 95 to drive actuate the segment driver 51 and digit driver 52, whereby the weight W is displayed by those of the display elements 50a through 50n corresponding to the weight display section 5a (FIG. 1). When the operator enters a unit price S using the ten-key arrangement on the input device 1, the processor 90 reads the value and stores it in the RAM 92 via the bus 95. The processor 90 then proceeds to multiply the weight W by the unit price S to compute the cost C of the batch of weighed articles. The processor 90 stores the price C in the RAM 92 and delivers both the unit price S and the cost C to the input/output port 93 to drive the segment driver 51 and digit driver 52, whereby S and C are displayed by those display elements 50a through 50n corresponding to the unit price display section 5b and cost display section 5c, respectively, shown in FIG. 1. If the operator presses the "PRINT" key, the processor 90 delivers the weight W, unit price S and cost C, stored in the RAM 92, to the input/output port 94, actuating the print driver 111 which in turn drives the printing mechanism 112 to print W, S and C on a receipt or label. At the end of one computation cycle performed in this manner, the initial state is restored wherein the processor again senses whether articles have been placed in the weighing tray.

(c) Upon sensing that any of the key contacts 10a through 10n is closed (ON) in step (a), the processor 90 responds by setting a timer area of RAM 92 to initiate a timing operation. When the content of the timer area is less than a time limit of, say, 15 seconds, the processor 90 again senses the state of the key contacts of input device 1 via the bus 95. If the ON state still holds, the processor 90, sensing that the content of the timer area is still less than the time limit, returns to the key contacts to check the state thereof through the bus 95.

(d) If the set time limit elapses and the processor 90 still senses that a key contact is in the ON state, despite the fact that the associated key is not being pressed by the operator, then the processor interprets this as indicating a constant short circuit caused by a malfunction and executes alarm processing. Thus the processor 90 causes a warning device (not shown) to issue an alarm and sends an alarm signal to the input/output port 93 through the bus 95, thereby actuating the segment driver 51 and digit driver 52 to give an alarm indication by way of the display elements 50a through 50n.

(e) If the key placed in the ON state enters the OFF state within the set time limit, however, then the processor 90 places the electronic scale in the checking mode and executes the test program stored in the ROM 91. As stated above, the items to be checked are of the eight kinds (1) through (8), each of which may be designated by using the ten-key arrangement on the input device 1. The processor 90 therefore is adapted to sense, through the bus 95, which key on the input device 1 has been pressed.

(f) If the operator presses the "0" key of the ten-key arrangement, then this will cancel the checking mode. The processor 90 reads the status of the "0" key, terminates the checking mode and places the scale in the computing mode of step (b).

(g) On the other hand, if the operator presses the "1" key, then the processor executes a zero-adjust program, reads the output of the A-D converter 122 through the bus 95 and stores it in the RAM 92. The processor then actuates the segment driver 51 and digit driver 52 through the bus 95 and input/output port 93, thereby displaying the A-D converter output by means of the display elements 50a through 50n. Since no articles will be located in the weighing tray 101 in the checking mode, the display should now read "0". A zero-point adjustment will be required for any reading other than "0". To this end, the operator now presses the "ZERO" key on the input device 1, causing the A-D converter output, stored in the RAM 92, to act as an offset value. This value is utilized from then on in the computing mode by subtracting it from the output of the A-D converter 122 produced in said mode, thereby assuring that the final output delivered as the weight value will be free of offset error.

When the operator presses the "2" key on the input device 1, the processor executes a key check program. According to this program, the number (code) assigned to a key will be displayed by the processor on the display device 5 when the corresponding key is pressed. This allows the operator to visually confirm proper operation of the keys and of the decoder 11.

When the "3" key is depressed, a display segment check program is executed wherein the processor 90 causes each of the display elements 50a through 50n of the display device 5 to be activated repeatedly for all of the numerals from "0" to "9". This makes it possible to confirm visually whether the segments of the display elements 50a through 50n are operating normally.

Pressing the "4" key causes the processor 90 to execute a RAM check program, wherein the processor writes data into the RAM 92, reads the data out of the RAM and then compares the written and read data to check the operation of the RAM, with the result being displayed on display device 5.

Pressing the "5" key initiates execution of a printing drum check program, wherein the processor 90 causes the printer 110 to print out the same numeral in all columns, i.e., in all digit places. This is repeated for all numerals from "0" to "9" so that the printing type on the printing drum of the printing mechanism 12 may be checked for flaws.

When the "6" key is pressed, the processor executes a print driver check program, wherein the processor causes the printer 110 to print out a different numeral in each column. Whether the print driver is operating normally or not can be judged based on the results of the printout.

If the operator presses the "7" key, then this will initiate execution of a display driver check program, wherein the processor 90 causes activation of all segments of the display elements 50a through 50n one digit at a time.

Finally, by pressing the "8" key, the operator initiates execution of a display brightness check program, wherein the processor 90 activates all segments of all digits made up of the display elements 50a through 50n. This enables the operator to check the brightness of each digit.

Thus, the test program is composed of zero-adjust, key check, display segment check, RAM check, printing drum check, print driver check, display driver check and display brightness check programs, the executed check program being decided by whichever of the "1" through "8" keys of the input device 1 is pressed by the operator. The check program is ended by pressing the "CLEAR" key (FIG. 1C) of the input device 1. Upon sensing that the "CLEAR" key has been pressed, the processor 90 returns to step (e) to initiate the checking mode. As long as the checking mode is not cancelled by pressing the "0" key, therefore, the operator can have the required checking operation executed merely by pressing the corresponding key. To cancel the checking mode, the operator need only press the "0" key, the processor 90 responding by establishing the computing mode.

The inventive method described hereinabove can of course be realized through hardware arranged as shown in the block diagram of FIG. 7. In this second embodiment of the present invention, the power ON signal S5 and key ON signal S6 are connected to a switching device 6. When only the signal S5 goes high, indicating the introduction of power, the switching device 6 applies the activation command signal S2 to the arithmetic device through a locking circuit 7. When the signals S5 and S6 both are high, the switching device applies the activation command signal S3 to the checking device 3 through the locking circuit 7. The latter circuit is adapted to prevent activation of the checking device 3 when the arithmetic device 2 has been activated, and vice versa. The signal S3 is also connected to a timing device 8, which is set into operation when the signal S3 goes high, indicating the key ON state (i.e., that the key ON signal S6 is high). If the signal S6 and, hence, signal S3, are still high even after the passage of the preset time, then the timing device 8 will issue the command signal S4 to activate the alarm device 4.

Figure 7:
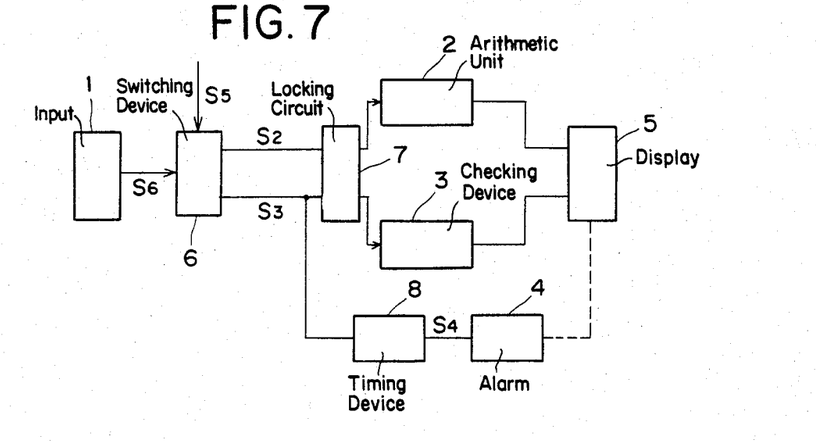
FIG. 7 is a block diagram of an arrangement according to a second embodiment of the present invention.
Figure 8:
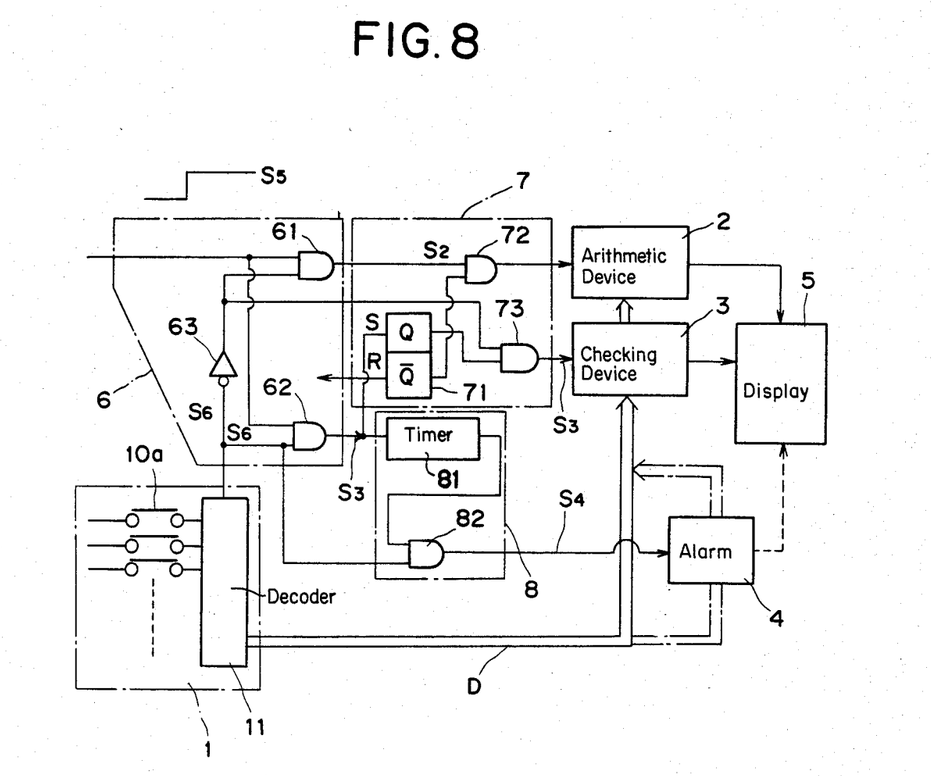
FIG. 8 is a circuit diagram showing a principle portion of FIG. 7 is greater detail.

FIG. 8 illustrates the arrangement of FIG. 7 in greater detail. The switching device 6 comprises switching logic for converting the key ON signal S6 into a control signal. Specifically, the switching device 6 includes a gate 61 which receives the power ON signal S5 as one input thereto, as well as the signal S6 applied through a NOT gate 63, and a gate 62 whose inputs are the signal S5 as well as the signal S6, the latter being received directly from the input device 1. The locking circuit 7 comprises an RS flip-flop 71, an AND gate 72 one input of which is the reset output of the RS flip-flop 71, the other input whereof is the output of gate 61 in switching device 6, and an AND gate 73 one input of which is the set output of the RS flip-flop 71, and the other input of which is the output of NOT gate 63 in switching device 6. The output of AND gate 72 is connected to the input side of the arithmetic device 2, and the output of AND gate 73 is connected to the input side of the checking device 3. The output of gate 62 in the switching device 6 is connected to the set input terminal of the RS flip-flop 71.

The timing device 8, which is the stage preceding the alarm device 4, comprises a timer 81 and an AND gate 82 whose two inputs are the key ON signal S6 from the switching device 6, and the output of timer 71.

In operation, the output of gate 61 of the switching device 6 will go to high level, forming the arithmetic device activation command signal S2, when power is introduced in the absence of a key ON signal from the input device 1. Flip-flop 71 will remain in the reset state. Under these conditions, the signal S2 is delivered by the AND gate 72, activating solely the arithmetic device 2. On the other hand, if power is introduced while any key of the input device 1 is in the ON state, then gate 62 will deliver the key ON signal S6 and flip-flop 71 will be held in the set state. If a key OFF state is subsequently established, sending the output of NOT gate 63 high, then the output of AND gate 73 also will go high, forming the checking device activation command signal S3 that is applied to the checking device 3 so that only the latter is activated.

When it is desired to establish the ordinary operating mode of the electronic scale, namely to activate the computing device 2, following completion of a checking operation, this can be accomplished by pressing the "CLEAR" key to reset the flip-flop 71.

If any key of the input device 1 should develop a short circuit prior to the introduction of power or during operation of the electronic scale, then the alarm device 4 will be set into operation by the activation command signal 4, which will be produced by the timer 81 when the set time expires. The alarm device 4 can be adapted to actuate a bell or the like to inform the operator of the short circuit by means of an audible alarm, or to present a visual warning using the display device 5.

The foregoing discussion relates to the signal path for designating activation of the computing device 2, checking device 3 and alarm device 4. The actual arrangement of the signal path is similar to that shown in FIG. 5. For example, signal transmission for the ordinary operating mode, namely the transmission of signals from the input device 1, arithmetic device 2 and display device 5, takes place via a data bus D.

In accordance with the present invention as described and illustrated hereinabove, it is possible to select either a computing mode or a checking mode depending upon whether or not a key is pressed at the introduction of power to the electronic scale. This facilitates the checking operation and enables an ordinary user to check the operation of the electronic scale in a simple manner.

As many apparently widely different embodiments of the present invention can be made without departing from the spirit and scope thereof, it is to be understood that the invention is not limited to the specific embodiments thereof except as defined in the appended claims.

I claim:

1. A method of selecting the operating mode of an electronic scale wherein either a computing mode or a checking mode is selected and operation is executed based on the selected mode, the computing mode being a mode wherein a control circuit performs an arithmetic operation based on a weight of articles sensed by a weight sensor and on items of data input from an input device having a plurality of keys, and causes a display device to display information relating to the articles, which information is inclusive of the result of the arithmetic operation, and the checking mode being a mode wherein said control circuit checks the operation of the electronic scale, said method comprising the steps of:
    (a) sensing the state of each said key of the input device at the time that power is introduced to the electronic scale;
    (b) executing operation in said computing mode when it is sensed in step (a) that no key of the input device is in the ON state;
    (c) executing operation in said checking mode when it is sensed in step (a) that any of said keys of the input device is in the ON state, said operating in said checking mode comprising selectively operating a plurality of individual checking modes according to any respective ones of said keys of the input device being in the ON state; and
    (d) producing an alarm when each said key in the ON state does not assume the OFF state within a predetermined period of time.

2. The method according to claim 1, further including a step (e), following said step (c), of cancelling the operation of any of said individual checking modes by depression of a further key of said input device, thereby enabling selection of another one of said individual checking modes by setting the respective key of said input device to the ON state.

3. The method according to claim 1, further including a step (e), following said step (c), of cancelling said operation of the checking mode by a further key of said input device, and of subsequently executing operation in said computing mode.

4. The method according to claim 1, said input device having a further key, further including the steps, following the step (c), of:
    (e) sensing the state of the keys of said input device;
    (f) cancelling said operation in the checking mode and executing operation in the computing mode upon sensing that the key in the ON state is said further key of said input device; and
    selecting the individual checking mode, corresponding to any respective one of said plurality of keys being placed in the ON state for executing operation based on the respective individual checking mode.

5. An electronic scale which comprises:
    a weight sensor for sensing the weight of weighed articles;
    an input device having a plurality of keys for entering items of data;
    a display device for displaying information relating to the weighed articles;
    a switch for providing electric power to the electronic scale; and
    a control circuit for sensing the state of each said key of said input device in response to introduction of electric power by said switch, for executing, when none of said plurality of keys is in the ON state, operation in a computing mode, wherein in said computing mode said control circuit performs an arithmetic operation based on the sensed weight of the articles and on said items of data, for operating in a checking mode when any of said plurality of keys is in the ON state, wherein said checking mode includes a plurality of individual checking modes respectively corresponding to at least respective ones of said plurality of keys, in which each said individual checking mode is operated according to the respective one of said plurality of keys being in the ON state, and for producing an alarm when any of said plurality of keys is in said ON state for more than a predetermined length of time.

6. The electronic scale according to claim 7, wherein said control circuit cancels said operation of any of said individual checking modes, corresponding to any of said plurality of keys being in the ON state, in response to depression of a further key of said input device, and enables operation of another one of the individual checking modes in response to the respective key of said input device being placed in the ON state.

7. The electronic scale according to claim 5, wherein said control circuit cancels said operation of the checking mode in response to depression of a further key of said input device, and enables execution of said operation in the computing mode.

8. The electronic scale according to claim 5, said control circuit comprising a processor for executing processing, and a memory for storing a control program in accordance with which said processor executes said processing for said operation in said computing and checking modes.

9. The electronic scale according to claim 5, further comprising a discrimination circuit for determining in which of the computing and checking modes said operation is to occur, based on the states of said plurality of keys of said input device when said electric power is provided.

10. The electronic scale according to claim 5, wherein said control circuit comprises:
  a discrimination circuit for determining in which of the computing and checking modes said operation is to occur, based the states of the keys of said input device when said electric power is provided; and
  a sensing circuit for sensing whether any of said plurality of keys in the ON state assumes the OFF state within the predetermined length of time, based on an output from said discrimination circuit and on the state of said plurality of keys of said input device.

* * * * *